(12) United States Patent
Eliasson

(10) Patent No.: US 12,062,199 B2
(45) Date of Patent: Aug. 13, 2024

(54) DISTANCE DETERMINATION BETWEEN AN IMAGE SENSOR AND A TARGET AREA

(71) Applicant: Smart Eye AB, Gothenburg (SE)

(72) Inventor: Anders Eliasson, Kullavik (SE)

(73) Assignee: Smart Eye AB, Gothenburg (SE)

(*) Notice: Subject to any disclaimer, the term of this patent is extended or adjusted under 35 U.S.C. 154(b) by 350 days.

(21) Appl. No.: 17/762,602

(22) PCT Filed: Sep. 22, 2020

(86) PCT No.: PCT/EP2020/076370
§ 371 (c)(1),
(2) Date: Mar. 22, 2022

(87) PCT Pub. No.: WO2021/058455
PCT Pub. Date: Apr. 1, 2021

(65) Prior Publication Data
US 2022/0366585 A1  Nov. 17, 2022

(30) Foreign Application Priority Data
Sep. 26, 2019 (EP) .................................. 19199873

(51) Int. Cl.
*G06T 7/73* (2017.01)
*G06T 7/521* (2017.01)
*G06T 7/60* (2017.01)

(52) U.S. Cl.
CPC .............. *G06T 7/521* (2017.01); *G06T 7/60* (2013.01); *G06T 7/73* (2017.01); *G06T 2207/30268* (2013.01)

(58) Field of Classification Search
CPC ........... G06T 7/50; G06T 7/507; G06T 7/536; G06T 7/60; G06T 7/70; G06T 7/73;
(Continued)

(56) References Cited

U.S. PATENT DOCUMENTS
2018/0096475 A1* 4/2018 Jemander et al. .... G01S 13/582

FOREIGN PATENT DOCUMENTS
JP 2007050834 A 3/2007
WO 2019036751 A1 2/2019

OTHER PUBLICATIONS
Wang, H., "Shadow Algorithms—Computer Science and Engineering," Course "Real-Time Rendering", CSE 5542, Spring 2013, Lecture "Shadow", Mar. 22, 2013 (Mar. 22, 2013), XP055677460, The Ohio State University, Department of Computer Science and Engineering Retrieved from the Internet: URL:http://web.cse.ohio-state.edu/-wang.36 02/courses/cse5542-2013-spring/19-shadow.pdf, slides 11-13 [retrieved on Mar. 18, 2020].
(Continued)

*Primary Examiner* — Andrew W Johns
(74) *Attorney, Agent, or Firm* — Hamilton, Brook, Smith & Reynolds, P.C.

(57) ABSTRACT

A method for determining a distance Dsensor between an image sensor and a target area of a driver of a vehicle, comprising arranging a light source at a known geometric relationship with respect to the image sensor, such that a structure in the vehicle at least occasionally casts a shadow in the target area, determining a distance Dlight source between the light source and the target area based on an image acquired be the image sensor of the target area including the shadow and a geometric relationship (e.g. distance) between the light source and the structure, and determining the distance Dsensor based on the distance Dlight source and the geometric relationship between the light source and the image sensor. With this approach, a reliable determination of the distance to the target area may be provided using only one single image sensor.

9 Claims, 4 Drawing Sheets

(58) Field of Classification Search
CPC .......... G06T 2207/30268; G06V 20/59; G06V 20/593; G06V 40/10; G06V 40/103; G06V 40/16; G06V 40/161; G01B 11/026; G01B 11/22; G01C 3/085; G01C 3/10; G01C 3/12
See application file for complete search history.

(56) References Cited

OTHER PUBLICATIONS

International Search Report for Application No. PCT/EP2020/076370, entitled "Distance Determination Between an Image Sensor and a Target Area," mailed Nov. 12, 2020.
Written Opinion for Application No. PCT/EP2020/076370, entitled "Distance Determination Between an Image Sensor and a Target Area," mailed Nov. 12, 2020.
Extended European Search Report for European Application No. 19199873.1, entitled "Distance Determination Between an Image Sensor and a Target Area," mailed Apr. 7, 2020.

* cited by examiner

DISTANCE DETERMINATION BETWEEN AN IMAGE SENSOR AND A TARGET AREA

RELATED APPLICATIONS

This application is the U.S. National Stage of International Application No. PCT/EP2020/076370, filed Sep. 22, 2020, which designates the U.S., published in English, and claims priority under 35 U.S.C. § 119 or 365(c) to European Application No. 19199873.1, filed Sep. 26, 2019. The entire teachings of the above applications are incorporated herein by reference.

FIELD OF THE INVENTION

The present invention relates to determining a distance between a single image sensor and a target area, in particular in an eye-tracking system.

BACKGROUND OF THE INVENTION

Traditionally in monitoring systems for vehicles such as vehicle occupant identification arrangements, or eye-tracking systems, techniques to determine the distance of a sensor device to a vehicle occupant have focused on identifying the position of a body part of a vehicle occupant e.g. the driver's head or face.

In most head or eye tracking systems, the face of a user is illuminated with a light source having a central wavelength outside the visible spectrum, and images of the face are acquired by one or several imaging sensors. In case of two image sensors ("stereo imaging") a distance to the face can be determined by triangulation. However, in systems with only one camera, determining the distance to the face may be difficult.

One approach is to measure (in the image) inter-pupillary distance or other similar parameter, and estimate the distance based on an expected value of the parameter. One major problem with this distance determination approach is the uncertainty in the estimation due to natural distribution of the measured parameter which leads to a range estimation error of around 10%. A different choice of parameter, such as iris size or cornea curvature, may minimize the uncertainty in the measurements, but as soon as the driver's eyes are covered e.g. by wearing glasses, measuring these features is affected by the refraction of light and becomes unreliable.

Thus, there is a need for an improved distance determination between a driver's face and a single image sensor.

GENERAL DISCLOSURE OF THE INVENTION

It is an object of the present invention to overcome the above mentioned problems, and to provide a feasible way to satisfactorily determine a distance between a single image sensor and a target area in a vehicle.

According to a first aspect of the invention, this and other objects are achieved by a method for determining a distance $D_{sensor}$ between an image sensor and a target area of a driver of a vehicle, comprising arranging a point light source at a known geometric relationship with respect to the image sensor, such that a steering wheel of the vehicle at least occasionally casts a shadow in the target area, determining a distance $D_{light\ source}$ between the light source and the target area based on an image acquired by the image sensor of the target area including the shadow and a geometric relationship (e.g. distance) between the light source and the steering wheel, and determining the distance $D_{sensor}$ based on the distance $D_{light\ source}$ and the geometric relationship between the light source and the image sensor.

According to a second aspect of the invention, this and other objects are achieved by an arrangement for determining a distance $D_{sensor}$ between an image sensor and a target area of a driver of a vehicle, comprising a point light source arranged at a known geometric relationship with respect to the image sensor and arranged such that a steering wheel of the vehicle at least occasionally casts a shadow in the target area, processing circuitry configured to determine a distance $D_{light\ source}$ between the light source and the target area based on an image acquired by the image sensor of the target area including the shadow and a geometric relationship between the light source and the steering wheel, and determine the distance $D_{sensor}$ based on the distance $D_{light\ source}$ and the geometric relationship between the light source and the image sensor.

The invention is based on the realization that a steering wheel located between the light source(s) and the target area will cast a shadow, which in turn may be used to determine a distance between the light source and the target area if the geometrical relationships between 1) the light source(s) and the steering wheel, and 2) the light source(s) and the image sensor are known.

With this approach, a reliable determination of the distance to the target area may be provided using only one single image sensor.

In principle, a known geometrical relationship (e.g. distance) between the light source and the steering wheel makes it possible to determine a first distance between the light source(s) and the target area based on the location and/or size of the shadow, while the known geometrical relationship between the light source and the image sensor makes it possible to translate this first distance to the required distance $D_{sensor}$. (Of course, an explicit calculation of the first distance may not be necessary.)

It is noted that the "known geometrical relationship" between the light source and the steering wheel in the following description for purposes of illustration is referred to as "distance". In many cases, this is also a correct description. In some cases, however, it is a simplification, as the steering wheel may not be in the same plane as the target area (e.g. face) and there is no single "distance". In such a case, the geometric relationship may be more complex than a scalar distance.

In some embodiments, the distance $D_{light\ source}$ may be determined by detecting, in the image, a width of a shadow of a specific portion of the steering wheel, and calculating the distance $D_{light\ source}$ as $d \times R/r$, where d is a distance between the light source and the steering wheel, r is a known width of the portion, and R is the detected width.

In other embodiments, the distance $D_{light\ source}$ may be determined by detecting, in the image, a position P of a shadow of a specific contour of the steering wheel, and calculating the distance $D_{light\ source}$ as $d \times P/p$, where d is a distance between the light source and the steering wheel, p is a position of the contour with respect to the optical axis of the light source, and P is the detected position, wherein the position p and the detected position P are both determined with respect to an optical axis of the light source.

The typical design of a steering wheel, with a ring and spokes, and its rotational motion during driving, makes it highly suitable for the purposes of the invention.

The portion or contour may be part of a spoke of the steering wheel. An advantage with using the spoke is that the steering wheel typically is not adjustable sideways. The horizontal component of the radially extending spoke will thus be unaffected of steering wheel adjustments up/down.

The distance between the steering wheel and the image sensor may be previously known, or determined during suitable calibration procedure. For example, the steering wheel may be provided with reflective markers with a known separation, making it possible to detect the distance between the image sensor and the steering wheel from an image acquired with the image sensor. Alternatively, the distance between the image sensor and the steering wheel is determined based on a value of a geometric parameter identified in an image acquired by said image sensor, and on a pre-identified value of the same geometric parameter at a known distance.

In some embodiments, the geometry (e.g. width of a spoke) of the steering wheel is desirable to facilitate the determination of the distance. Such geometry may be known, e.g. from CAD information relating to the steering wheel of a vehicle. Alternatively, in situations when such information is not available, the geometry of the steering wheel may be determined from an image acquired by the image sensor, and based on a known distance between the image sensor and the steering wheel.

In some embodiment, an angular position of the steering wheel is detected to facilitate the determination of the distance. If the geometry of the steering wheel and its angular position are known, the angle of the side of the spoke is known, which facilitates identification of the spoke-shadow. Also, the position of the spoke is known, so it is not critical to be able to acquire an image of the steering wheel. This allows an implementation with the image sensor unable to "see" the steering wheel.

Alternatively, in some embodiments, the shadow pattern, geometry of the steering wheel, the distance between the steering wheel and the image sensor, or the angular position of the steering wheel may be determined by providing appropriate output of the measurements (e.g. geometric parameters identified in an acquired image) as a function over time to an artificial neural network trained on the variety of geometrical dimensions and locations of the steering wheel.

BRIEF DESCRIPTION OF THE DRAWINGS

The present invention will be described in more detail with reference to the appended drawings, showing currently preferred embodiments of the invention.

FIG. 2a is a side view of the eye-tracking system in FIG. 1.

FIG. 2b is a schematic illustration of geometrical relationships in FIG. 2a.

FIG. 3b is a schematic illustration of geometrical relationships in FIG. 3a.

DETAILED DESCRIPTION OF PREFERRED EMBODIMENTS

In the following detailed description, some embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details.

The basics and conventional techniques in electronics, sensor systems, image analysis, signal processing, data communication systems, image acquisition systems, and other components to carry out the invention are considered to be readily understood by the skilled person in the art and therefore for the sake of brevity, further explanations and details will be omitted in this description.

In other instances, well known constructions or functions are not described in detail, so as not to obscure the present invention.

Figure 1:
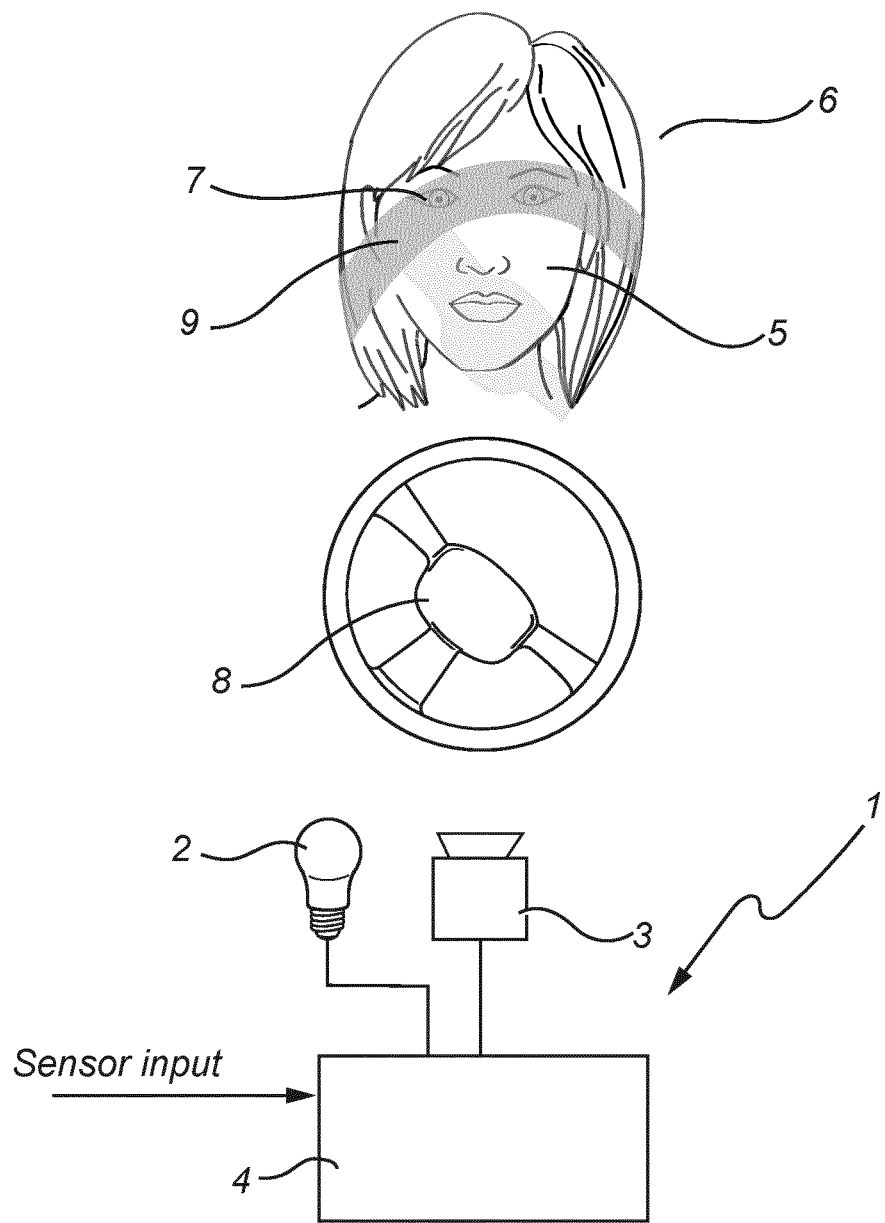
FIG. 1 is a schematic illustration of an eye-tracking system in accordance with an embodiment of the present invention.

FIG. 1, 2a, 3a show an eye-tracking system 1 for detecting eyes of a user. The system comprises a light source 2, an image sensor 3 and processing circuitry 4. The image sensor 3 is configured to acquire images of a target area, here the face 5 of a user 6. The processing circuitry is configured to identify and detect the eyes 7 of the user 6.

Figures 2A, 2B:
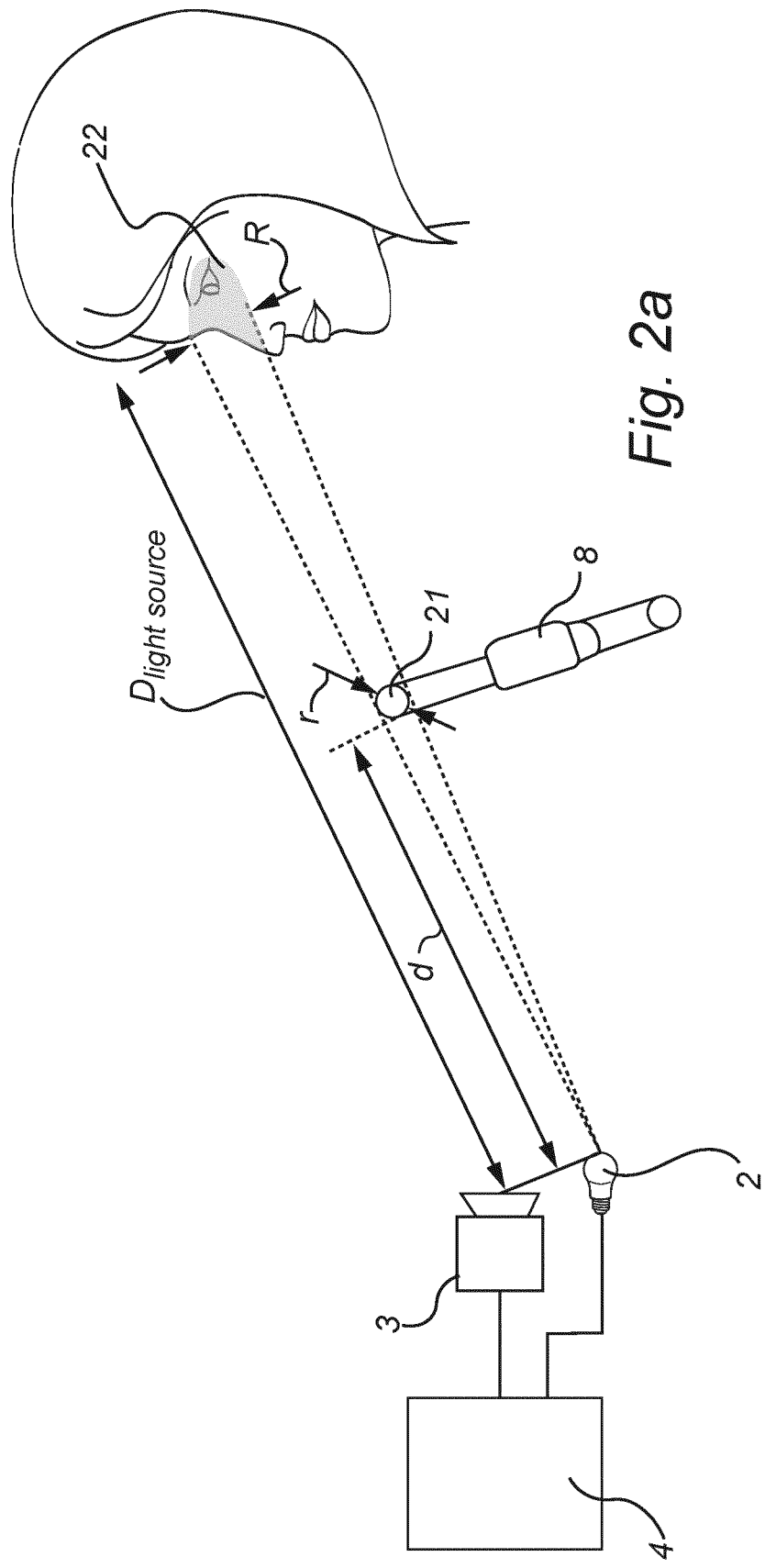
Figure 3A:
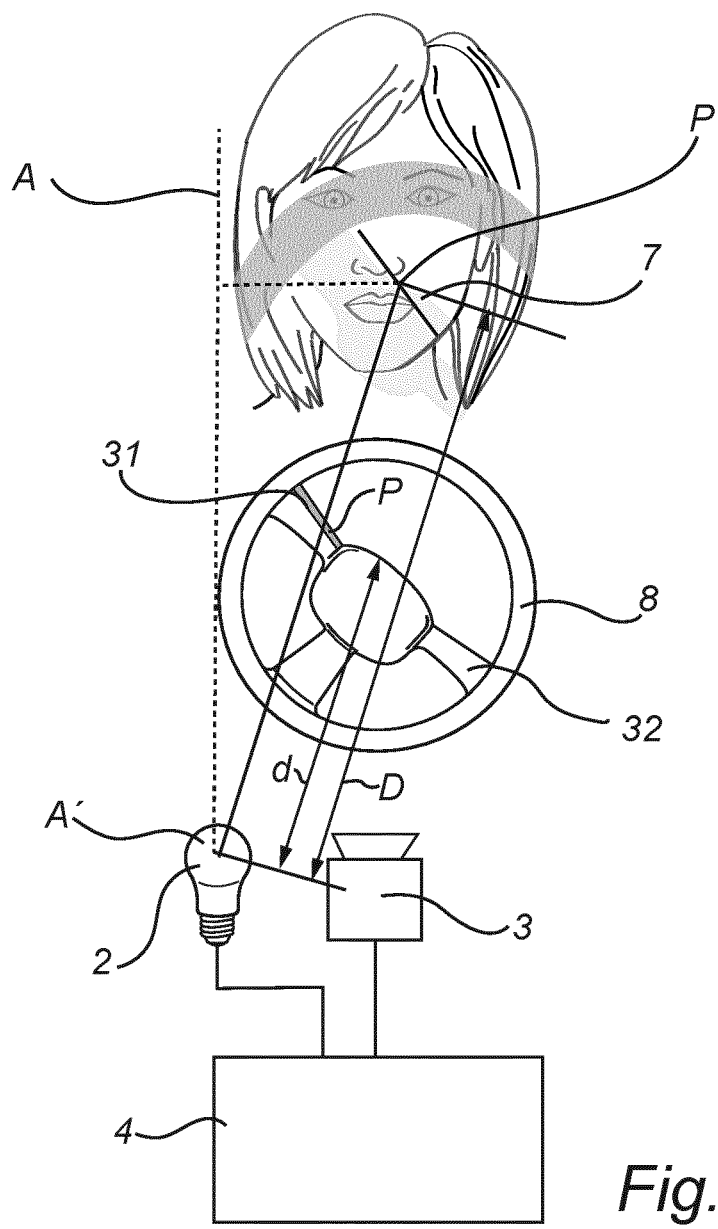
FIG. 3a is another schematic illustration of the eye-tracking system in FIG. 1.

Although a single light source is illustrated in FIGS. 1, 2a, 3a, it is possible to provide more than one light source. Alternatingly illuminating the target area with at least two light sources may be advantageous e.g. for purposes of reflex reduction/elimination. The light source 2 may be any suitable type of light source, including but not limited to light emitting diode (LED)s operating in different wavelength domains preferably having a central wavelength in the infrared (IR) or near IR part of the light spectrum, eye-safe laser sources with divergence lenses or the like. In this preferred embodiment the light source 2 is an IR LED. In order to eliminate or minimize interference from ambient light the light source is used in combination with a band-pass filter having a pass-band centered around the center IR wavelength. The center wavelength can be in the near IR region, e.g. 840 nm or 940 nm. The filter has a pass-band enabling capturing of most light emitted by the light source, while at the same time blocking most ambient light.

The image sensor 3 can be a camera or a photodetector such as semiconductor image sensors, photodetectors, thermal detectors, PIN diodes or avalanche diodes. The camera 3 may further be a charge coupled device (CCD) sensor array, or a complementary metal-oxide semiconductor (CMOS) sensor array, or similar. In the case of a narrow band light source, such as an IR LED as mentioned above, the image sensor 3 may be provided with a pass-band filter (not shown) having a pass-band corresponding to the spectrum of the light source 2.

Further the light source 2 and image sensor 3 may be arranged so that the transmitted signal is synchronously demodulated to filter out ambient IR noise, thus improving the quality of captured images even with low intensity IR LEDs. The IR light transmitted from the LED can be continuous wave over a predetermined time period or pulsing light at a predetermined frequency. The sensitivity and resolution of the image sensor 3 may be selected such that the recorded image is suitable for further data processing such as image processing or to be used as an input for machine vision algorithms.

The light source 2 and image sensor 3 may be arranged to be time synchronized. The processing circuitry 4 may be configured to operate computer vision systems and image processing algorithms for processing and analysing images acquired from the image sensor 3.

Further, the processing circuitry 4 may be configured to perform other functions such as determining position of the head of the user e.g. when the driver moves his or her head, the processing circuitry 4 may be configured to use the position information to determine the direction in which the head moves and compute changes in the distance between the target area 7 and the image sensor 4. The processing circuitry 4 is also configured for sending and/or receiving data between different components of the vehicle or remote data centres. Further, the processing circuitry 4 is in this case connected to the IR image sensor 3 and other components via wired connections. However, it is conceivable to use wireless connections instead of wired connections to access remote components.

A steering wheel 8, is located between the light source and the face 5, so that the steering wheel casts a shadow 9 on the face 5.

The processing circuitry may also be connected to receive various sensor input to facilitate the processing. For example, information about current steering wheel angle may be provided to the processing circuitry.

As it should be appreciated, even though in this example the light source 2, the image sensor 3 and the processing circuitry 4 are illustrated as separate components, this may or may not be the case in a different example. Other combinations such as integrating the light source 2 or the processing circuitry 4 with the image sensor 3 or a remote processing circuitry 4 arranged to wirelessly receive data from the image sensor 3 etc. are readily conceivable for the person skilled in the art. Thus, some, or all, of these components may form part of a single unit in a different example.

With reference to FIG. 2, a specific portion, here the rim 20 of the steering wheel 8 is used to determine the distance $D_{light\ source}$. In this example the specific portion 20 has a known width "r" and the distance between the LED 2 and steering wheel 8 is "d". When illuminated by the LED 2, the rim 20 creates a corresponding shadow portion 22 with a width "R" on the target area 7.

In this embodiment, the processing circuitry 4 is arranged to detect and identify the size of the casted shadow portion 22 in an acquired image. The incident light from the LED 2 projected on the rim 20 and the corresponding shadow 22 create two similar triangles Δabc~Δade as signified in FIG. 2b. By using the triangle proportionality theorem, it is determined that the corresponding altitudes and sides of the two similar triangles are proportional to each other and in this example the processing circuitry 4 determines the distance $D_{light\ source}$ as $D_{light\ source} = d \times R/r$.

In the embodiment in FIG. 3a, a position "p" of a specific contour, here an edge 31 of a spoke 32 of the steering wheel 8 is determined with respect to the optical axis A of the LED 2. A position "P" of a portion 34 of the shadow 9 corresponding to the position p is detected by the processing circuitry 4 in acquired images. Just as in FIG. 2a, the distance between the LED 2 and the steering wheel 8 is labelled d.

Figure 3B:
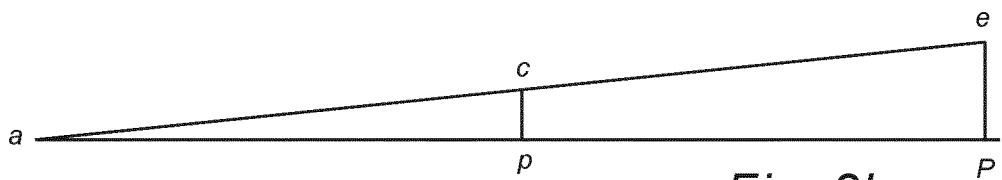

Again, and with reference to FIG. 3b, two similar triangles Δapc~Δape are formed, where c and e are located on the optical axis A. If the positions p and P are expressed as normal distances to the optical axis A, the distance $D_{light\ source}$ may be determined as $D_{light\ source} = d \times P/p$. It should be appreciated that determination of the distance $D_{light\ source}$ is also readily conceivable by choosing other similar triangles.

The operation of the system 1 in FIGS. 1, 2a, 3a will be described in the following with reference to the flowchart in FIG. 4.

In step S1, the light source 2 is arranged such that a shadow of the steering wheel 8 is casted on the face 5 of the user 6. In some installations, the part of the steering wheel 8 will always be located between the light source 2 and the face 5. In other installations, the shadow may only be visible for some positions of the steering wheel.

In step S2, the image sensor 3 acquires one or several images including the face 5 with the shadow 9 of the steering wheel 8. The acquired image(s) is provided to the processing circuitry 4 for suitable image processing.

In steps S3-S5, the processing circuitry 4 determines the distance between the image sensor 3 and the face 5, based on the relationships discussed above. First, in step S3, the processing circuitry 4 extracts the width d and/or position p of the shadow 9. For example, by providing the captured shadow of the steering wheel as input to the image processing algorithm, the corresponding pixel information from the captured images can be extracted. The extracted pixel information may include pixel brightness or colour, pixel dimensions, or pixel location on the target area which in turn can be used to compute the size or position of the shadow. Information about current steering wheel angle may facilitate the identification of contours of the shadow, e.g. an edge of a spoke, which will have an inclination correlated to the steering wheel angle.

Then, in step S4, the information from S3 is used to determine the distance $D_{light\ source}$ between the light source 2 and the target area 5. Finally, using a known geometrical relationship between the light source 2 and the image sensor 3, the distance $D_{sensor}$ between the image sensor 3 and the target area 7 can be accordingly calculated in step S5.

Figure 4:
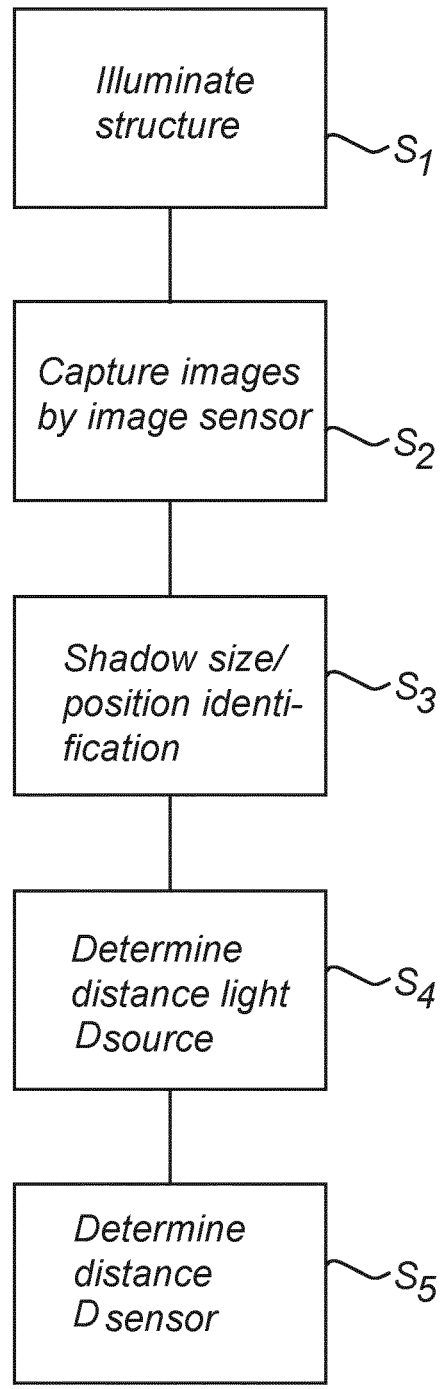
FIG. 4 is a flowchart of a method in accordance with an embodiment of the present invention.

It is noted that the process in FIG. 4 typically only needs to be performed once for each driving session. After an initial determination of the distance $D_{sensor}$, continuous distance measurement can be made using some invariable parameter (e.g. iris size). By measuring this parameter at the initially determined distance, any change of distance may be detected by monitoring this parameter.

The person skilled in the art realizes that the present invention by no means is limited to the preferred embodiments described above. On the contrary, many modifications and variations are possible within the scope of the appended claims. For example, the details of the eye tracking system disclosed herein are not critical for the operation of the present invention.

The invention claimed is:

1. A method for determining a distance $D_{sensor}$ between an image sensor and a target area of a driver of a vehicle, comprising:

arranging a point light source at a known geometric relationship with respect to the image sensor, such that a steering wheel of the vehicle at least occasionally casts a shadow in the target area;

determining a distance $D_{light\ source}$ between the point light source and the target area based on an image acquired by the image sensor of the target area including the shadow, and a geometric relationship between said point light source and said steering wheel; and determining the distance $D_{sensor}$ based on said distance $D_{light\ source}$ and said known geometric relationship between the point light source and the image sensor, wherein the distance $D_{light\ source}$ either is determined by:
detecting, in the image, a width R, of a shadow of a specific portion of the steering wheel, and calculating the distance $D_{light\ source}$ as $D_{light\ source} = d \times R/r$, where d is a known distance between the point light source and the steering wheel, r is a known width of said portion, and R is the detected width, or is determined by:

detecting, in the image, a position P of a shadow of a specific contour of a portion of the steering wheel, and calculating the distance $D_{light\ source}$ as $D_{light\ source} = d \times P/p$, where d is a known distance between the point light source and the steering wheel, p is a known position of the contour, and P is the detected position, wherein the position p and the detected position P are both determined with respect to an optical axis of the point light source.

2. The method according to claim 1, wherein said portion is a rim or a spoke of the steering wheel.

3. The method according to claim 1, further comprising:

determining a distance between the image sensor and the steering wheel, and determining the distance d between the point light source and the steering wheel based on said distance between the image sensor and the steering wheel and said known relationship between the point light source and the image sensor.

4. The method according to claim 3, wherein the distance between said image sensor and said steering wheel is determined based on a value of a geometric parameter identified in an image acquired by said mage sensor, and on a pre-identified value of said geometric parameter at a known distance.

5. The method according to claim 3, wherein the distance between said image sensor and said steering wheel is determined based on positions of a set of markers in an image acquired by said image sensor, said markers being arranged on said structure at predefined positions.

6. The method according to claim 1, wherein the method further includes determining a geometry of said steering wheel from an image acquired by said mage sensor, and based on said distance between said image sensor and said structure.

7. The method according to claim 1, wherein the method further includes detecting an angular position of the steering wheel.

8. An arrangement for determining a distance $D_{sensor}$ between an image sensor and a target area of a driver of a vehicle, comprising:

a point light source arranged at a known geometric relationship with respect to the image sensor and arranged such that a steering wheel of the vehicle at least occasionally casts a shadow in the target area, processing circuitry configured to:

determine a distance $D_{light\ source}$ between the point light source and the target area based on an image acquired be the image sensor of the target area including the shadow, and a geometric relationship between said light source and said steering wheel, and determine the distance $D_{sensor}$ based on said distance $D_{light\ source}$ and said known geometric relationship between the point light source and the image sensor, wherein the distance $D_{light\ source}$ either is determined by:

detecting, in the image, a width R, of a shadow of a specific portion of the steering wheel, and calculating the distance $D_{light\ source}$ as $D_{light\ source} = d \times R/r$, where d is a known distance between the point light source and the steering wheel, r is a known width of said portion, and R is the detected width, or is determined by:

detecting, in the image, a position P of a shadow of a specific contour of a portion of the steering wheel, and calculating the distance $D_{light\ source}$ as $D_{light\ source} = d \times P/p$, where d is a known distance between the point light source and the steering wheel, p is a known position of the contour, and P is the detected position, wherein the position p and the detected position P are both determined with respect to an optical axis of the point light source.

9. The arrangement according to claim 8, wherein the system further comprises an angular sensor for detecting the angular position of the steering wheel.

* * * * *